June 7, 1955 G. E. FOSTER 2,710,397
ELECTRICAL MEASURING APPARATUS
Filed June 24, 1950 3 Sheets-Sheet 1

FIG. 1

FIG. 3a — COMMAND PULSE (INPUT TO PULSE SHAPER)

FIG. 3b — DIFFERENTIATING CKT. (OUTPUT TO GRID. 29 OF TUBE 27)

FIG. 3c — E ACROSS R 35

FIG. 3d — E APPLIED TO TUBE 40

FIG. 3e — E APPLIED TO GRID. 92 OF TUBE 90

FIG. 3f — E APPLIED TO GRID. 61 OF TUBE 57

FIG. 3g — OUTPUT OF PHANTASTRON TO GRID. 64 OF TUBE 57

FIG. 3h — OUTPUT OF TUBE 57 TO OSCILLATOR CONTROL TUBE GRID. 95

FIG. 3i — VOLTAGE ON C 101

FIG. 3j — VOLTAGE ON PLATE 67

FIG. 3k — WAVEFORM OUTPUT VARIATION ON PLATE 67 WITH VARIOUS APPLIED VOLTAGES

INVENTOR.
GEORGE E. FOSTER
BY
ATTORNEYS

FIG. 2

United States Patent Office 2,710,397
Patented June 7, 1955

2,710,397

ELECTRICAL MEASURING APPARATUS

George E. Foster, Chicago, Ill.

Application June 24, 1950, Serial No. 170,159

15 Claims. (Cl. 340—347)

The present invention relates in general to an electrical measuring device, and in particular to an electrical measuring unit which is adapted to linearly express the accomplished measurements of various characteristics in terms of representative impulses.

In the determination of the load characteristics of various types of electrical circuits and the automatic recording thereof by automatic equipment, it is generally necessary to effect the expression of the measurements as accomplished in terms of representative impulses which are capable of controlling an associated counting recording or transmitting apparatus. Various types of devices have been developed for such purpose, but with the rapid expansion of the scope of the electrical field known types of measuring devices have generally proven unsatisfactory and inadequate for use with the newer types of equipment and there is, therefore, a definite need for an improved type measuring device in the art.

The measuring devices previously known have had several predominant shortcomings which particularly include slowness of operation and nonlinearity in operation. One known type of measuring device, for instance, utilizes a series of capacitors which are arranged to assume potential charges commensurate with the particular characteristic to be measured, and to operate an associated impulse generator unit to provide a number of impulses which is determined by the value of the charge imposed on the capacitors. In the use of such type impulse generator the variations which arose as a result of the exponential nature of the charging curves of the capacitor units and the potential leakage which is inherent in the associated circuits was sufficient to effect a non-linear representation which was especially unreliable when used for the measurement of critical values in modern type electronic installations.

A second type of measuring apparatus which has been used heretofore comprises the use of a mechanical balancing relay, one side of which is connected to the load to be measured and the other side of which is supplied by various corresponding loads of known value. As the known value approaches the value to be measured, the operation of the balancing reading is effected and a number of impulses which are representative of this value are then provided by associated automatic equipment. Such equipment is, of course, comparatively slow in operation and when a series of measurements at a given installation are to be made at frequent intervals, the associated communication equipment is tied up for excessive time periods and tends to hamper the flexibility of the system. Further, balancing relays of this general type are somewhat critical in operation and require constant maintenance and supervision when used in the field.

Other known types of equipment for effecting the automatic measurement of electrical load characteristics have become similarly inadequate for use in the rapidly expanding electrical field which, generally speaking, demands equipment having greater flexibility, increased speed of operation, and greater accuracy in its measurements than has been heretofore attained, and it is to the provision of an improved type measuring device that the present invention is directed. It is specifically the object of the present invention to provide a novel and improved electrical measuring device which is extremely speedy in its operation and which provides linear measurements in an extremely reliable and accurate manner.

A particular example of the application of an electrical measuring device in the commercial field is exemplified by the arrangement set forth in Patent 2,366,913, which was issued January 9, 1945 to Titus G. LeClair. The invention set forth therein is directed to an automatic printing and totalizing metering system which, as there shown, is adapted to determine and record at frequent intervals one or more of the load characteristics of the generating station and substation transmission lines and to effect the recording thereof at a centralized control station. The nature of the modern day power systems requires that the measuring apparatus at the substation, which is to be used to report to the centralized recording equipment, shall be extremely expeditious in operation to prevent the tying up of the central unit for excessive periods of time, and speed of operation is accordingly a prime requisite of a measuring system used in such arrangement.

Further, as in all electrical measuring operations, it is extremely essential that accuracy and reliability of operation be of the highest order to insure safe control of the equipment.

It is a specific object of the present invention to provide an electrical measuring unit which is exceedingly fast in operation and extremely accurate and reliable in its measurements whereby it is adaptable for ready use with the automatic printing metering system of the type set forth in the aforedescribed patent and which is adapted for use with other known types of supervisory remote control systems.

A specific feature of the disclosed electrical measuring device is the linear nature of the output of the device when used to measure both A. C. and D. C. signals. Such feature is a distinct advancement over previous known types of measuring devices and especially over A. C. measuring devices which are generally of the square law type and which are extremely unreliable and difficult to read on the lower portion of the scale. In the device disclosed herein, the reading of one unit is as linear in its representation as ten units or two hundred units. The accomplishment of linear readings in this manner has been a particular problem which has always proven troublesome to the art and is considered to be an important advancement in the field.

Still another feature of the fundamental measuring device, which is related to the linearity of the system, is the ability to provide a zero setting from which linear representation may be initiated.

Other advantages and features of the new and novel electrical measuring device will become apparent with reference to the following disclosures and description in which.

GENERAL DESCRIPTION

The electronic measuring device of the invention basically comprises a waveform generating unit which is operative to measure a given electrical voltage and to provide a series of impulses which in their generation are linearly indicative of the value of the measured load.

Figure 1:
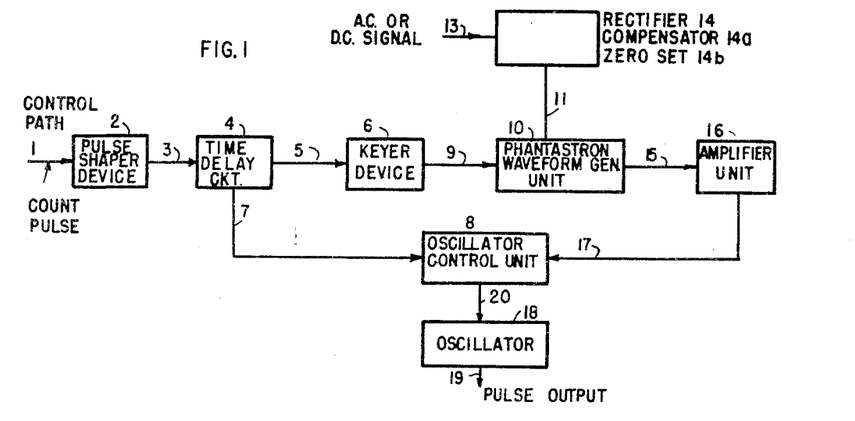
Figure 1 is a schematic block representation of the component parts of the novel electronic device.

With reference to Figure 1, the individual units of the device are shown thereat in block form to facilitate the understanding of the invention and to effect a brief and concise explanation of the sequence of the circuit operations.

As there shown, the device is arranged to be operatively energized to initiate a measuring operation responsive to receipt of a pulse (referred to hereinafter as a "count command" pulse) over an input path 1. For purposes of illustration, the command pulse used in effecting such initial operation may be of the conventional type shown in Figure 3a.

A pulse shaping device 2 is arranged to operate responsive to receipt of a count command pulse over the input path 1 to develop an operating pulse of the predetermined shape and value shown in Figure 3c and to transmit such pulse over a connecting path 3 to a time delay circuit 4.

Time delay circuit 4 in operating accomplishes two functions, the first being to initiate operation of a keying device 6 over a first path 5 and the second being to effect the partial control of an oscillator control unit 8 over a second path 7. Specifically, the time delay circuit 4 is effective over path 7 to prevent operation of the oscillator control unit until a predetermined time has elapsed during which the possibility of non-linear operation of the impulse generating equipment has expired. As the predetermined time interval expires the time delay circuit 4 is effective to unlock the portion of the oscillator control unit 8 controlled thereby to permit its operation thereafter.

As the time delay circuit 4 is operated, it is also effective to transmit a positive triggering pulse (Figure 3f) over the interconnecting path 5 to a keying device 6, which responds thereto to transmit a triggering pulse over an interconnecting path 9 to the phantastron waveform generating unit 10.

The waveform generator unit 10 comprises a "phantastron" type circuit which is capable of generating a linear time wave form or gate, that is, a rectangular waveform output which is a linear function of a given input control voltage.

The input control voltage, according to the invention, is the voltage to be measured and is applied to the waveform or gate generator unit 10 over a path 11. The voltage may be continuously connected thereto over path 11 or may be connected at predetermined intervals through the means of a selection switch. As indicated at path 13 the incoming voltage signals may be of an alternating current or direct current type, the A. C. type signal being necessarily first passed through a rectifier circuit arrangement at 14 and a compensator 14a to provide a corresponding D. C. signal. Both the D. C. and A. C. voltage signals are passed through a zero set 14b prior to their passage to the phantastron waveform generating circuit. Although the D. C. signals may be applied directly to the phantastron circuit, for purposes of convenience the A. C. and D. C. signals are shown as traversing a common path.

The waveform or gate generator on receipt of the keying impulse operates for a time interval which is determined by the value of the representative direct current signal which is applied to the associated input circuit 11, and during its period of operation effects the output of a waveform or gate which is linearly a function of the voltage appearing on its input circuit, that is, the width of the waveform along the horizontal axis is linearly proportional to the value of the quantity to be applied to its input circuit 11. Another way of describing the waveform generator is to state that it is a variable time base circuit, which when keyed by an impulse, produces a linear time gate the duration of which is proportional to the amplitude of said impulse.

It is obvious, of course, that various conditions, positions, and other variable characteristics of an electrical or mechanical device may be measured through the use of any of the well known voltage generators which are operative to develop a voltage which is representative of the particular condition, position, etc., to be measured and the invention is not to be considered as being limited to use in measuring only load voltages.

The linear output of the phantastron or variable time base waveform generating circuit is applied to the amplifier unit 16 over a path 15 to accomplish amplification of the generated waveform prior to its control of the oscillator control unit 8. It will be remembered that with the initiation of the operation of the time delay circuit 4 in response to receipt of a count command pulse, the time delay circuit 4, in addition to initiating the operation of the waveform generator equipment, was also effective to lock the oscillator control circuit 8 against operation. The time delay provided by the time delay circuit 4 will thus be the zero starting point, i. e. operation of the phantastron or variable time base electronic circuit prior to that time being ineffective to provide a registered measurement.

In more detail, the time delay provided by circuit 4 is chosen so as positively to provide sufficient time for the phantastron linear time gate generating unit 10 to operate in a linear manner. Accordingly, the input level of the voltage appearing on the input path 11 for the phantastron or variable time base circuit must be adjusted to such time delay and a given zero starting point is thereby effected. The zero set apparatus 14b is utilized for such purposes. Specifically, operation thereof to the proper voltage supplying point effects the provision of a basic waveform which is of a time duration equal to that of the time delay provided by time delay circuit 4.

Thus if a count command pulse is received to initiate a measuring operation at a time when there is no voltage connected thereto for measuring purposes, the basic waveform equivalent in time duration to the time delay of circuit 4 is nevertheless effected to effect recording of a true zero measurement. A waveform which produces one impulse, for example, will have a basic portion which is equivalent in time duration to the time delay period of time delay circuit 4 (which brings it to the zero point) plus an effective width or time duration which is determined by and which is linearly indicative of one impulse. The effective width, of course, increases linearly as the value or amplitude of the measured voltage increases, the basic portion being constant for each measurement.

The oscillator control unit is unlocked by the time delay circuit and the generated waveform or gate. As the zero starting point is then reached an oscillator unit 18 is energized for a period which is determined by the width or duration of the socalled effective portion of the wave. The application of a number of pulses to the output circuit 19 is thereby effected, the number of pulses being determined by the time of energization of the oscillator by the effected waveform or gate portion. As the waveform is completed, the oscillator control unit 8 is relocked to terminate transmission of the impulses, and the equipment is restored to its normal condition.

DETAILS AND OPERATION OF MEASURING DEVICE

Consideration will now be given to the arrangement of the individual elements comprising the equipment which has been shown in block form in Figure 1, and the manner in which such equipment is operative. Basically, the general circuit arrangement comprises a pulse shaper device 2 including a dual triode tube unit 27 which may comprise a conventional 12AU7 tube or its equivalent; a connecting circuit 3 including a diode tube unit 40, which may be a conventional 6AL5 or its equivalent; a time delay circuit 4 including a dual triode tube unit 41, which may be a conventional 12AU7 tube or its equivalent; a keying device 6 including a dual triode tube unit 57, which may comprise a conventional 12AU7 or its equivalent; a phantastron or variable time base waveform or gate generating circuit 10 including a two control grid vacuum tube 66 (used as a mixer) which may be a conventional 6BE6 or 6AS6 tube or the equivalent; an oscillator control unit 8 including a dual triode tube 90 which may be a conventional 12AU7 tube or its equivalent; and an oscillator unit 18 including a dual triode tube 102 which may be of the 12AU7 type or its equivalent. In the event that a signal of an alternating current type is to be measured, the equipment will also include a compensating circuit arrangement including a diode tube 136 such as a 6AL5, or its equivalent, and a series of conventional rectifier tube units 124 to 127 inclusive which may be conventional 6AL5 tubes, selenium type rectifier, or any other of the well known rectifier units. The input arrangement may be varied in accordance with well known practice.

Further refinements including the detailed circuit connections will become apparent now with reference to the following description of the circuit operation.

For purposes of a concise description the electrical measuring device will first be assumed to be connected to a given substation bus by an input circuit 13 comprising a pair of input conductors 13a and 13b, whereby measurements of the voltage conditions thereon are effected with each operation of the measuring device. The input voltage may be of A. C. or D. C. in nature. It is apparent that since the equipment is arranged to measure voltage variations, a representative voltage may be used to measure any type of load, or the condition or position of any forms of electrical or mechanical devices. Various commercial means for providing voltages which vary in direct proportion to the quantity etc. to be measured are well known and are accordingly not set forth herein.

A measuring operation by the device is initiated by the application of a "command" pulse to the control path 1 which comprises a pair of control conductors 20 and 21, positive potential being normally applied to conductor 20 for plate supply purposes and conductor 21 being connected to ground. The use of a command pulse for initiation of operation is extremely advantageous in adapting the unit for use with remotely disposed automatic equipment. The command pulse is applied by the input path 1, to a capacitor and resistance "differentiating network" comprising a pair of resistances 22 and 23 and a capacitor 24, "differentiating networks" as used herein referring to the practice established in the art as set forth in "Waveforms," first edition; by Chance et al (McGraw-Hill Book Company, Inc., 1949). The output side of the differentiating circuit is connected to control a two section pulse shaper tube 27 which is connected across the incoming conductors 20 and 21 as a cathode coupled amplifier, the cathodes 30 and 33 being connected to conductor 21 by a cathode resistor 28' and the plates 28 and 31 being connected to the positive conductor 20 over plate load resistors 34 and 35 respectively.

Figures 3A, 3K:
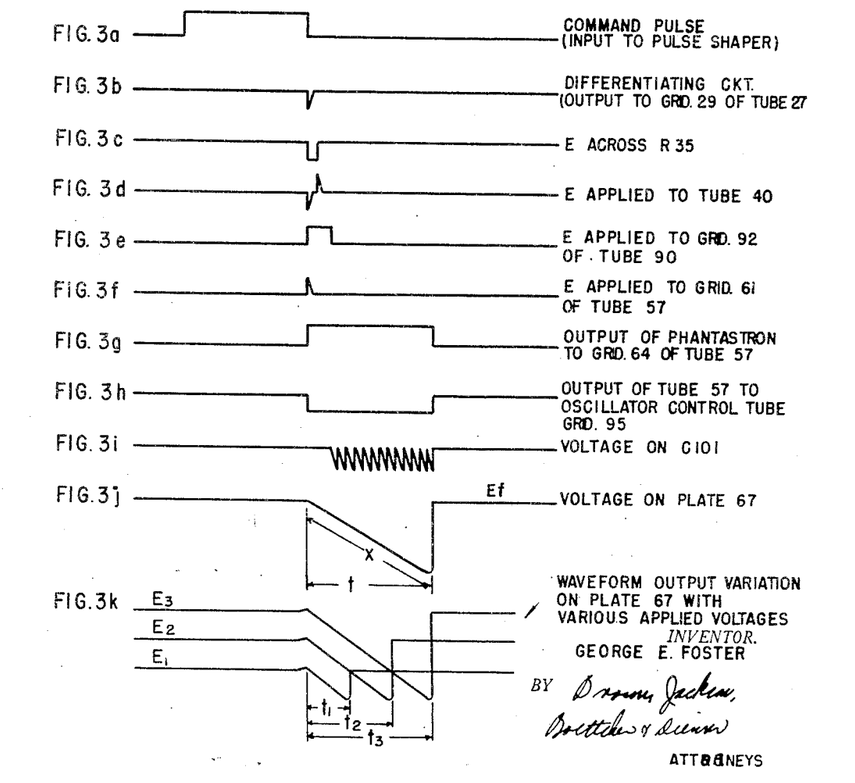
Figure 3 is a showing of the voltage output at the several stages of the electrical measuring device.

The differentiating circuit comprising resistors 22 and 23 and capacitor 24 is connected to the grid-cathode circuit of the left hand section of tube 27 over capacitor 26 and a resistor 25 which are arranged as an integration system to prevent operation by false transients. The left hand section of the pulse shaper tube 27 is normally biased to conduct. The differentiating circuit is arranged to differentiate the incoming command pulse so that only the trailing edge of the input pulse appears upon grid 29 of the pulse shaper tube 27. The nature of the pulse applied to the grid 29 responsive to receipt of a command pulse (Figure 3a) is shown in Figure 3b.

With application of the negative going pulse to the grid 29 (Figure 3b) the left hand tube section is now rendered non-conductive. The grid 32 of the second tube section is connected to the plate 28 of the first section by a capacitor 36 and to the negative conductor 21 by resistor 37. As the left hand section is rendered non-conductive, therefore, by virtue of the cathode coupling resistor 28' and the resistor 37 and capacitor 36, a positive voltage is impressed upon grid 32 of the second section of the pulse shaper tube 27 whereupon the second portion of the tube is rendered conductive.

The period of conductivity for the second section exists for the period that the differentiated negative pulse is applied to the first section of tube 27 and as a result the voltage which appears across the plate load resistor 35 for the period of conductivity takes the form of the pulse shown in Figure 3c. Since the switching action of the pulse shaper tube 27 is extremely rapid, the pulse is quite short in its duration, that is to say, considered along a time base.

Following application of the differentiated pulse to grid 29 of pulse shaper tube 27, the first section of the tube becomes conductive and the second section of the tube is rendered non-conductive. The pulse shaper tube 27 having provided the desired type starting pulse is now returned to its normal standby condition to await the receipt of further command pulses.

A capacitor 38 and resistor 39 are connected across the plate load resistor 35 and as the voltage pulse (Figure 3c) appears thereacross it is in turn differentiated by the capacitor 38 and resistor 39 and a sharp negative-going pulse, followed by a sharp positive pulse (Figure 3d) is applied to the cathode 40a of the coupling tube 40 which at its plate 40b couples only the negative going pulse to the time delay circuit 4.

The time delay circuit 4 comprises a two section time delay tube 41 which is connected as a monostable multi-vibrator. This type of multi-vibrator is also variously known as a "flip-flop" or "one-shot" or "gating" multi-vibrator. Specifically, the tube comprises two sections having anodes or plates 42 and 45, control grids 43 and 46 and cathodes 44 and 47 respectively. The plates 45 and 42 are connected to the positive conductor 20 by plate load resistors 51 and 52 respectively, the plate 45 of the left hand section of tube 41 being also coupled to the grid 43 of the right hand section of tube 41 by an RC network comprising a capacitor 53 and a resistor 54. The network is in turn connected to the negative conductor 21 by resistor 55.

The left hand section of the tube is normally biased to conductivity and the right hand section of the tube is normally biased non-conductive. With application of the negative pulse output by the coupling tube 40 to the plate 42 of the right hand section of the time delay tube 41, a negative pulse is applied over capacitor 48 to the grid 46 for the left hand section of the time delay tube 41 to render that section of the tube non-conductive.

As the left hand section of the tube 41 is thus rendered non-conductive, a positive potential is applied over the coupling network comprising capacitor 53 and resistor 54 to the grid 43 of the right hand section of the tube to render that section conductive for a time interval determined by the constants of the coupling network comprising capacitor 48 and resistor 56. That is, as the condenser 48 discharges, it approaches a point where a potential positive with respect to the cathode will reappear on grid 46 and the left hand section of the tube will be once more rendered conductive. The voltage appearing on plate 45 of the left hand section of the tube 41 during this switching operation is shown in Figure 3e.

The time delay circuit 4 accomplishes two purposes in its time delay operation, the primary purpose being to effect the energization of the keying device 6 and the second purpose being to delay operation of the oscillator control unit 8 until the measuring device has been properly energized for operation. The keying device 6 basically comprises a two section tube 57, the left and right hand sections comprising respectively plates 60 and 65, control grids 61 and 64 and cathodes 62 and 63. The plate 60 for the left hand section is connected to conductor 20 and the grid 61 is connected to the plate-cathode circuit of the left hand section of time delay tube 41 by a differentiating circuit comprising capacitor 58 and resistor 59.

Since the left hand section of the keying tube 57 is connected as a cathode follower, the potentials which are applied thereto by the differentiating circuit (capacitor 58 and resistor 59) responsive to the described momentary switching operation of the time delay circuit tube 41 will render the left hand section of tube 57 conductive and effect the provision of a positive going triggering pulse at its output side which may be used to initiate operation of the associated waveform or gate generating circuit 10.

The waveform generator 10 is of the phantastron type, that is to say, a linear timing waveform of variable time base, but having an output gate the duration of which is a linear function of the input control voltage. This gate generator basically comprises an electronic tube 66 having a plate 67, a suppressor grid 68, shield grids 69 and 71, a second control grid 70, a first control grid 72, and a cathode 73. Shield grids 69 and 71 are connected to the cathode of the left hand section of keying tube 57 and to conductor 20 by resistors 74 and 75.

The plate 67 of the phantastron tube 66 is shown as being connected to the voltage source to be measured over an interconnecting compensating circuit 14a, a zero set circuit 14b and a resistor 76 whereby the plate is normally biased to the voltage to be measured. The grid 72 is also coupled to the conductor 20 by resistors 78 and 79 and to the plate circuit by capacitor 77.

A second control grid 70 is connected by a resistor 81 and a capacitor 80 to the screen grids 69 and 71 of the phantastron or variable time base circuit tube 66 for purposes to be more fully described hereinafter. The second control grid 70 is biased by a negative potential obtained over a resistor 82 from a source of the order of 150 volts.

The operation of the tube 66 in generating indicative waveforms which are representative of the voltage to be measured is effective with the receipt of a keying impulse from the left hand section of tube 57.

Specifically, in the normal standby condition screen grids 69 and 71 of the phantastron tube 66 are positively biased to about 30 volts to effect the flow of current from positive conductor 20 over resistors 74 and 75, screen grids 69 and 71, and cathode 73 to ground. Accordingly, with the screen grids 69 and 71 biased positive, a negative bias is impressed on the second control grid 70 by the interconnecting resistance network comprising resistors 81 and 82 and the 150 volt negative potential source. Inasmuch as the second control grid 70 is negatively biased there is no flow of plate current.

With receipt of the keying impulse from the cathode 62 of the left hand section of tube 57, over the connecting path comprising capacitor 80 and resistor 81, the second control grid 70 is rendered positive and current flow from cathode 73 to plate 67 is effected. The value of the current flow is limited however by the constants of the RC circuit comprising capacitor 77 and resistors 78 and 79.

With the corresponding current flow from left to right through capacitor 77, a negative pulse is applied to the first control grid 72 which substantially reduces the current flow through the tube, such reduction being effected until an equilibrium condition is reached which allows a very small current to flow through the tube. As the current flow through the tube 66 continues in this manner, the potential on plate 67 is reduced until such time as the plate 67 no longer influences the control grid 72.

An increase of current flow through the tube is thereupon effected which causes a voltage drop across the resistors 74 and 75 and through the RC coupling comprising resistor 81 and capacitor 80 to render the second control grid 70 negative and thus terminate the flow of plate current.

The waveform which appears upon the plate 67 of phantastron tube 66 during the operation thereof is shown in Figure 3j, and as there shown the duration of the waveform (indicated by the letter "X") occurs during a time period "t" which is linearly proportional to the value of the voltage appearing on the plate for measurement purposes plus the voltage determined by the zero set circuit 14b. It is obvious that the time duration of the wave will be greater with application of a larger plate voltage for measurement purposes and less with application of a smaller plate voltage.

As explained hereinbefore, a so-called effective portion of the waveform is arranged to represent the voltage measured, the first portion of the waveform being in the form of a constant provided by a zero set circuit 14 comprising resistors 133, 134 and 135; that is the zero set circuit 14b is normally adjusted to provide a predetermined voltage which variable time base circuit to provide, for each operation by a command pulse a basic waveform or gate which has a time duration commensurate with that of the time delay provided by time delay circuit 4. Since measurements are prevented by the time delay circuit 4 during the time delay period the initial constant portion of the wave is "cancelled out" and measurement starts after that point is reached. This point of measurement initiation is known as the zero point. Any extension of the width of the waveform or gate beyond the basic portion is linearly proportional to the value of the voltage applied for measurement purposes.

With reference to Figure 3k, the various time periods which are effected with the application of various amplitudes of voltage are illustrated thereby, that is, with the application of a voltage of value $E_1$ to plate 67, a waveform or gate having a duration of $t_1$ will be effected; with the application of a larger voltage $t_2$ to plate 67 a waveform or gate having a time duration of $T_2$ will be effected, and with the application of a still greater value of voltage $E_3$ to plate 67, the waveform or gate having a time duration indicated by $t_3$ will be effected. In each instance the duration $t_1$, $t_2$ or $t_3$ of the effective waveform or gate is linearly proportional to the amplitude of the applied voltage E1, E2, or E3 and is initiated from a given zero starting point. The indications provided thereby being linear in nature, a linear reacting scale may be used therewith to provide an improved type measuring device. Departure from linearity during the operation of the variable time base electronic circuit of this device is less than .1% and the circuit is considered extremely accurate in operation.

Referring to Figure 3g, the waveform shown thereat is that which will appear at the screen grids 69 and 71. Such waveform is coupled to the amplifying section of the keying device 57 by a resistor 81. The connection of the generated waveform output of the phantastron or variable time base circuit to the second section of the keying device tube 57 serves to prevent the application of too great a positive voltage to the second control grid 70 of the phantastron tube and also amplifies the pulse to permit proper control of the oscillator control unit 8. The plate 65 of the amplifier tube 57 is connected to the positive conductor 20 by plate load resistor 85 and a parallel connected resistor 87 and neon tube 86. It is apparent that with operation of the right hand section of tube 57 an operating circuit for the neon tube 86 will be completed in conventional manner whereby a visual indication of the operation of such tube is provided for the attendant.

The plate 65 is also coupled over path 17 to an oscillator control unit 8 which comprises a two section triode control tube 90. The two sections of the oscillator control tube 90 comprise plates or anodes 91 and 94, control grids 92 and 95, and cathodes 93 and 96 respectively. The oscillator control tube 90 is arranged to be controlled in its operation jointly by the amplifier unit 16 and the time delay circuit 4, the grid 92 of the left hand section of the tube being biased by resistor 98 and a 150 volt negative potential energizing source, and being connected to the output side of the time delay circuit 4 over the interconnecting path 7 including resistor 97. The right hand grid 95 is connected to the output section of the keying device 6 by path 17 which includes a resistor 99 and is biased by a 150 volt negative potential energizing source over resistor 100. The left hand section of tube 90 is therefore normally biased to cut off and the right hand section of the tube 90 is normally conductive.

As the time delay circuit 4 was initially operated responsive to receipt of the command pulse, a positive voltage pulse, such as shown in Figure 3e, was applied to grid 92 over the interconnecting path 7 and resistor 97. The grid 92 is rendered positive with receipt of the pulse and the left hand section of the tube 90 becomes conductive. A brief interval thereafter, the amplified negative voltage pulse which is representative of the measured quantity (Figure 3h) is applied over the output path 17 and resistors 99 and 100 to the control grid 95 to render the right hand section nonconductive. At this point then, the oscillator is locked against operation even though the representative pulse has been initiated.

After a time period which is predetermined by the constants of the time delay circuit 4, the positive impulse (Figure 3e) is removed and the left hand section of the tube 90 is rendered non-conductive. Both sides of the oscillator control tube 90 are now rendered non-conductive and the energization of the oscillator unit 18 is effected.

The oscillator unit 18 comprises a two section oscillator tube 102, the left and right hand sections comprising plates or anodes 103 and 106, control grids 104 and 107, and cathodes 105 and 108 respectively. A capacitor 101 connected in the cathode circuit of the oscillator control tube 90 is normally charged as a result of the energization of the right hand section of the oscillator tube 90. The upper plate of the capacitor 101 is also connected to the cathode 105 of the left hand section of oscillator tube 102 and over resistor 117 and 118 to ground. A second resistance network comprising resistors 114 and 115 is arranged to be connected with capacitor 101 to ground through a single throw switch 116.

Plates 103 and 106 of the oscillator tube 102 are respectively connected through plate load resistors 109 and 110 to the positive conductor 20, one side of the plate 103 being also coupled to one side of the oscillator output circuit 19. The second plate 106 is also connected to the grid 104 of the first section to effect operative control thereof. A capacitor 113 is connected between the plate 103 of the left hand section of tube 102 and the grid 107 of the right hand section of tube 102. Grid 107 is also connected through resistor 112 to the positive conductor 20. The normal state of the oscillator tube 102 is therefore with the right hand section in the conductive state.

When both sections of the oscillator control tube 90 are rendered non-conductive responsive to operation of the phantastron circuit and the elapse of the predetermined time period, the capacitor 101 will discharge through resistors 117 and 118 (and through 114 and 115 if the single throw switch 116 is closed to ground). The right hand section being conductive, grid 104 is normally a few volts above ground. As the voltage on cathode 105 of the left hand section of tube 102 falls, it approaches a voltage where conductivity of the left hand side will be effected. As this point is reached and the left hand section of the tube conducts, a negative impulse is imposed on the grid 107 of the right hand section to render same non-conductive. The right hand section is rendered non-conductive for a time interval which is determined by the RC constant of the network comprising capacitor 113 and resistor 112. During the period that the left hand section conducts, capacitor 101 charges over the left hand section and resistor 109, an alternative path extends over grid 104 and resistor 110. At the approximate time that capacitor 101 has assumed a full charge, the time constants of the RC circuits ((101, 109, and 110 and tube resistance) and (113 and 112)) are such as to effect cutoff of the left hand section.

As capacitor 113 has discharged sufficiently to permit the grid 107 to pass current to the plate 103 the right hand section of the tube becomes conductive and the interconnected grid 104 will take control of the left hand section to terminate the current flow in the left hand section of the tube 102. The tube is now in its initial condition and condenser 101 again discharges to effect a second cycle and the provision of a second impulse on path 19 by plate 103.

The provision of oscillations by the oscillator unit 18 across the pulse output path 19 is effected for a period of time which is determined by the effective duration or width of the waveform generated by the phantastron unit (the effective width of the waveform having been determined by the amplitude of the voltage to be measured). It is apparent that following transmission of the phantastron negative waveform impulse or gate, the grid 95 is positively biased and right hand section of the oscillator control unit 8 will once more be rendered conductive. Inasmuch as the oscillator tube 102 is negatively biased whenever either section of the control tube 90 is conductive, the operation of the oscillator tube 102 is terminated.

The voltage occurring on capacitor 101 is shown in Figure 3i, pulses suitable for actuating associated electronic counters may be obtained from the plate 103 of the oscillator tube 102, the pulse output circuit 19 being shown for such purposes. The frequency rate of oscillation of the oscillator tube 102 is known, having been specifically designed for such rate and it is obvious that the period of energization thereof by the gate from the variable time base circuit effects the provision of a number of pulses which is directly proportional to the energizing time. The apparatus is extremely sensitive in nature and provides as linear a representation in the provision of one pulse as in the provision of two hundred. The frequency rate may be altered by adjustment of the resistors 117 and 118, or by opening or closing the switch 116 to include or remove the resistors 114 and 115 from the condenser discharge circuit.

The primary purpose of the time delay which is introduced is to prevent measurement of the desired quantity during the initial energization of the phantastron tube 66 during which the tube might possibly be reacting in a non-linear manner. In addition, as previously pointed out, a zero set structure is also used in the signal input path to effect the provision of a signal input of a level which will effect a constant waveform output of the tube 66 for the phantastron unit for a time period which is commensurate with the time delay period provided.

Referring now to the input circuit 13 comprising conductors 13a and 13b, it is apparent that as the alternating current signals are applied thereto a set of rectifier tubes 124 to 127 inclusive are operative in conventional manner to develop a direct current signal across resistor 128. A D. C. signal may be imposed on the same terminals or alternatively on the terminals marked 13c and 13d. The input signals in either case are filtered by resistors 129, and 131 in cooperation with capacitors 130 and 132.

A zero set resistance network comprising resistors 133, 134, and 135 is used to provide the initial direct current level which corresponds to the time interval provided by the time delay circuit 4.

Diode tube 136 is used as a curve correcting diode to compensate for any non-linearity which may arise from the action of the rectifier arrangement comprising tubes 124 to 127 inclusive, the correcting tube 136 being connected across the rectifier in series with a resistor 137, and to ground through a parallel resistor 138.

The cathode 63 of the amplifier section of tube 57 is connected through a single throw switch 122 to its ground connection whereby an auxiliary circuit is provided for preventing energization of the oscillator should such operation be desired. Resistor 119 is provided to insure that the cathode 63 of the second section of tube 57 will go to a positive voltage, while resistor 120 and capacitor 121 are connected across resistance 119 to act as a spark suppressor whenever the single throw switch 122 is operated.

For purposes of effecting a working embodiment, representative values of the various components of the arrangement are set forth at this point.

*Values of circuit components for a specific embodiment*

| Cond. Ident. Number | Values In Microfarads | | Cond. Ident. Number | Values In Microfarads |
| --- | --- | --- | --- | --- |
| C1 | 24 | .01 | C9 | 121 | .01 |
| C2 | 26 | 200μ | C10 | 80 | .01 |
| C3 | 36 | 200μ | C11 | 77 | .05 |
| C4 | 38 | .001 | C12 | 101 | .002 |
| C5 | 48 | .01 | C13 | 113 | 200μ |
| C6 | 50 | .1 | C14 | 132 | .05 |
| C7 | 53 | 200μ | C15 | 130 | .05 |
| C8 | 58 | .001 | | | |

| Resist. Ident. Number | Values In Megohms | | Resist. Ident. Number | Values In Megohms |
| --- | --- | --- | --- | --- |
| R1 | 22 | .56 | R24 | 87 | .33 |
| R2 | 23 | .56 | R25 | 99 | .33 |
| R3 | 25 | .1 | R26 | 100 | 1.0 |
| R4 | 34 | .047 | R27 | 97 | .33 |
| R5 | 35 | .015 | R28 | 98 | .56 |
| R6 | 39 | .1 | R29 | 114 | .01 |
| R7 | 28 | .015 | R30 | 115 | .027 |
| R8 | 37 | .56 | R31 | 117 | .01 |
| R9 | 56 | .56 | R32 | 118 | .1 |
| R10 | 51 | .047 | R33 | 109 | .015 |
| R11 | 52 | .047 | R34 | 110 | .1 |
| R12 | 56 | .1 | R35 | 112 | 1.0 |
| R13 | 54 | 1.0 | R36 | 78 | .22 |
| R14 | 55 | .33 | R37 | 79 | 1.0 |
| R15 | 49 | .015 | R38 | 76 | .33 |
| R16 | 59 | .1 | R39 | 131 | .1 |
| R17 | 74 | .015 | R40 | 129 | .1 |
| R18 | 75 | .015 | R41 | 128 | .047 |
| R19 | 81 | .1 | R42 | 135 | .0056 |
| R20 | 85 | .047 | R43 | 134 | .01 |
| R21 | 119 | .1 | R44 | 133 | .1 |
| R22 | 120 | .0056 | R45 | 137 | 3.0 |
| R23 | 82 | .20 | R46 | 138 | .56 |

SPECIFIC APPLICATION

The electrical measuring device described heretofore has application in many commercial fields and as an example of the tremendous advantages inherent in such device, a particular one of the applications is set forth at this point.

Figure 4:
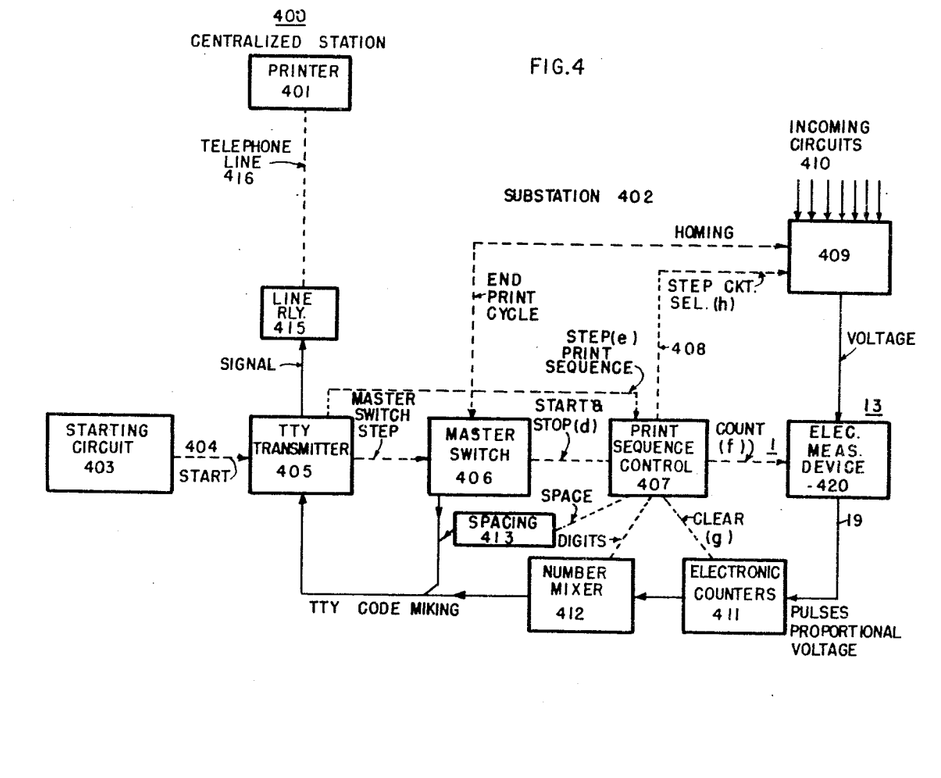
Figure 4 is a schematic block diagram of the novel automatic printing and measuring system including the novel electrical measuring device.

With reference to Figure 4, there is shown thereat in block form a system for automatically scanning a series of electrical circuits or apparatus at predetermined time intervals, determining the value of a particular characteristic thereof, and producing a printed record of the values so determined. More specifically, the apparatus is adapted to scan a series of incoming bus circuits located at a remotely disposed substation, to determine the value of the particular load characteristics for each circuit, reducing the determined values to a predetermined code, and transmitting the code over an interconnecting communication system to a printer located at a centralized office.

A system of this general type is disclosed in said Patent No. 2,366,913 referred to above, and the electrical measuring device of the present invention is particularly adapted for use in such type system. As pointed out in that patent, in the planning or development of power transmission systems it is necessary that the additional transmission lines be based on load records which are reasonably complete and accurate and such information may only be obtained through systemized and careful study of the load conditions which are extant at the particular substation in question. Further, a more accurate study is accomplished through the use of automatic totalizing apparatus, the planning engineer being able quickly to brief himself without being required to study a number of scattered columns on a log sheet. The error which frequently arises in personal analysis of detailed totalization may thereby be eliminated.

The equipment used in the arrangement disclosed in Figure 4 may be similar to that disclosed in the aforementioned patent, or may be the electronic equivalent thereof. The operation of the equipment is generally the same and only a brief review thereof will be set forth at this time.

Referring now to Figure 4, the system there shown comprises a centralized control station 400 interconnected with one of a series of substations such as 402 by an interconnecting communication link such as a telephone line 416. The illustrated substation 402 as shown locates a series of power line circuits 410 and automatic equipment for effecting the automatic determination of the value of the desired load characteristic (current, voltage, etc.), reducing such determination to code form and transmitting same over the interconnecting link 416 to the printer 401 at the control station 400. Each of the substations will be assumed to be arranged to report at predetermined different times during the day. It will also be assumed that the equipment at the substation 402 is in the normal at rest condition with all of the cycling equipment at is normal "home" or at rest position, and that the predetermined operating time of the equipment is now reached.

A contact making clock which forms a part of the starting circuit 403 is arranged to close its contacts to initiate the cycling of the equipment (illustrated in block form) to step over a series of incoming circuits 410.

Figure 2:
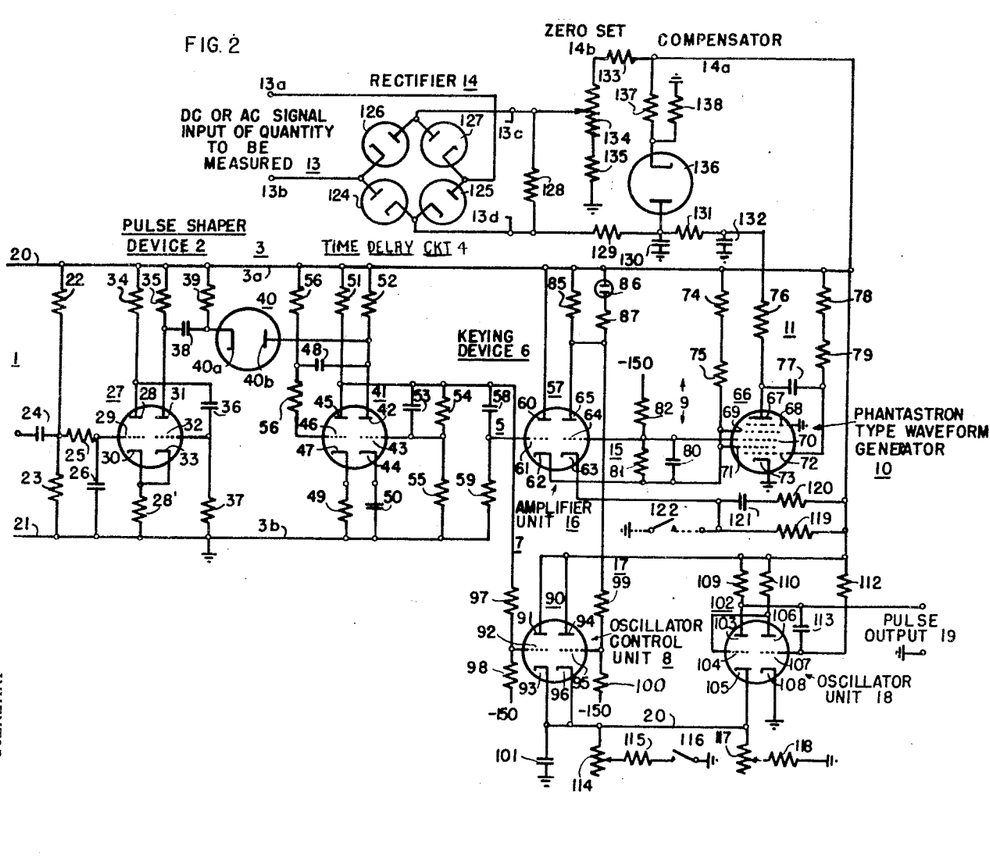
Figure 2 is a schematic sketch of the details of the circuit arrangement for the electronic measuring device.

Specifically, as operation of the equipment is initiated, a transmitter 405 is energized to prepare for transmission of the measurements made by the apparatus and a master sequence switch 406 is operated to initiate the energization of the print sequence control equipment 407. The print sequence control unit 407 effects the operation of the stepping of a selection switch 409 to the first of the incoming circuits 410 and connects that circuit to the input terminal 13 of the electrical measuring device 420 described heretofore Fig. 2. Simultaneously, the print sequence control circuit 407 effects the transmission of a count command pulse over the input path 1 to the electrical measuring device 420 to initiate the operation thereof. The pulse shaper device 2 energizes to initiate operation of the time delay circuit 4 which in turn energizes the keying device 6 and temporarily locks one portion of the oscillator control unit 8. The keying device 6 in energizing effects the energization of the phantastron or variable time base unit 10 which operates in the manner heretofore described to generate a gate or waveform the duration of which is proportional to the amplitude of the voltage on the connected one of the incoming circuits 410 and effects the control of the right hand section of the oscillator control unit 8 therewith. As the time delay circuit 4 thereafter controls the left hand section of the oscillator control unit 8 the oscillator unit 18 is energized to generate a series of impulses which are representative of the measured quantity (for example, proportional to a voltage) and causes such impulses to be transmitted over the output path 19 to a series of electronic counters 411. The electronic counters register the received impulses in digital form (units, tens, hundreds, etc.) after which the print sequence control 407 examines the members registered on the counters, a digit at a time, and by means of the number mixer 412 converts the digits to teletype code.

The coded markings are then transmitted by a transmitter line relay 415 over the link 416 to a printer 401 located at the centralized station.

As the recording of the load characteristics of the first incoming circuit have been completed, the master switch 406 is operative to step to the second incoming circuit of the sequence to effect the measuring of the load characteristics thereof and the corresponding transmission of indicative impulses across the communication line 416 to the centralized station for the recording and totalizing thereof at that station. The equipment is arranged to step over or scan the series of circuits and as the last incoming circuit has been measured and metered the master switch 406 effects the transmission of a homing signal which restores the equipment to its normal at rest position.

CONCLUSION

The advantages of the new and novel measuring device are particularly brought out by the above description of its use in a specific application. Other applications in other fields will, of course, immediately become apparent to those skilled in the art.

The ability of the device to provide linear measurements of both A. C. and D. C. voltage signal inputs renders the unit extremely flexible and adaptable for use in connection with other measuring devices and additionally the extreme sensitivity of this basic and fundamental instrument (.1%) suggests a future of unlimited and unrestricted scope.

The basic circuit arrangements and the components thereof are comparatively simple and practical, the unit basically consisting of seven operating tubes, many of which are of a similar type. As a result, the disclosed device is extremely economical in its initial cost and low in maintenance costs.

The specific operating features of the instrument are clearly set forth in the specification and include among others speed of operation, flexibility in use, and reliability and accuracy in its measurement. Further the ability to provide one impulse or two hundred impulses, each of which is linear in its representation, and all of which is effected from an adjustable zero starting point effects the accomplishment of a fundamental and basic measuring device which has been long needed in the electrical field.

Various other features which are believed to be new are set forth in the accompanying claims.

I claim:

1. A basic electronic measuring device comprising apparatus arranged to measure a given quantity which may at times have a zero value, said device being actuated by a D. C. voltage proportional to said quantity, and including means for converting the value of said quantity into and expressing the same as said D. C. voltage proportional to said quantity in the event said quantity does not already constitute said D. C. voltage, said D. C. voltage being connected to the input of said device and comprising the actual characteristic to be measured, including pulse producing means producing an oscillator stimulating pulse of substantially linear character proportional to the voltage actuating the same and thereby having at least a linear portion, an oscillator controlled by the said stimulating pulse, means simultaneously keying the pulse producing means and rendering the oscillator inoperative for a predetermined period of time corresponding to the beginning of the oscillator stimulating pulse whereby the oscillator will be operating only upon the linear portion of said pulse, the resulting number of oscillations being thereby linearly proportional to the input voltage.

2. A device as described in claim 1 in which there is provided means for producing a D. C. level corresponding to the time interval during which the oscillator is rendered inoperative, said voltage being superimposed upon said level and the combined voltage being fed to actuate said pulse producing means, whereby true zero measurement is provided.

3. A device as described in claim 1 in which the pulse producing means comprises a variable time base electronic circuit which produces a linear time gate proportional to a D. C. input voltage to the said circuit.

4. In an electronic measuring device arranged to measure a given D. C. voltage, command pulse producing means adapted to be initiated at will to initiate operation of said measuring device, a D. C. level producing circuit for adding a voltage to that to be measured, a plate-input electronic pulse producing circuit of the variable time base type and having circuit constants to provide a linear time gate the duration of which is proportional to the D. C. voltage fed to its input, means for feeding the combined voltages to the said input, a multiple pulse producing circuit of electronic oscillator type, a time delay circuit, said command pulse being connected to trigger the time delay circuit and key the linear time gate circuit, means feeding the output of the time delay circuit and the linear time gate circuit to said multiple pulse producing means, said last mentioned means arranged to be locked by the time delay output and unlocked by the linear time gate circuit output, whereby after the time delay has elapsed, a number of pulses will be produced whose number is proportional to the size of the gate circuit pulse minus that portion cut off by the time delay.

5. A device as described in claim 4 in which the D. C. level is chosen so that the added size of the gate circuit pulse caused thereby is exactly equal to that portion cut off by the time delay pulse.

6. In an electronic measuring device for effecting the measurement of given electrical loads which are applied over an associated input path, the combination of starting means for initiating operation of said device, generating means controlled by said starting means comprising a phantastron tube, means for applying to the plate of said phantastron tube a direct current pulse the voltage of which is indicative of the voltage of the applied load, said phantastron tube responding thereto by generating a waveform having an effective portion which is linearly indicative of the value of the voltage of the applied load, impulse generating means operatively controlled in accordance with the linear indications of said generated waveform, and time delay means jointly controlled by said starting means and said waveform to effect operation of said impulse generating means only after the elapse of a given period of time after operation of said starting means, the number of impulses provided by said impulse means being linearly proportional to the time duration of said waveform subsequent to said predetermined elapsed period.

7. In an electronic device as set forth in claim 6 in which the effective portion of said generated waveform is adjustable in its occurrence relative to said time delay period whereby the initiaton of the effective portion and the termination of said time delay are adjustable to a common zero point.

8. In an electronic measuring device for effecting the measurement of given electrical loads which are applied over an associated input path, the combination of starting means for initiating operation of said device, generating means comprising a phantastron tube having its plate potential responsive to the voltage of the applied load for providing a waveform which is linearly indicative of the value of the voltage of the applied load, impulse generating means operatively controlled by said generated wave form and time delay means including a two section control tube, one section being normally biased to conduct, said tube being operative with either section conductive to prevent operation of said impulse generating means, the other section of said tube being energized by said starting means for a given period of time after operation of said starting means, said one section being rendered non-conductive responsive to said waveform, said other section being rendered non-conductive with termination of said time delay, whereby said impulse generating means provides a series of impulses commensurate with the time duration of the waveform subsequent to the rendering of said control tube non-conductive.

9. In an electronic measuring device for effecting the measurement of electrical loads which are applied over an associated input path, the combination of starting means operative to transmit a command pulse periodically at spaced time intervals for initiating operation of said measuring device, generating means comprising a phantastron circuit responsive to said command pulse for providing a waveform which is linearly indicative of the value of the applied load, zero set means for controlling said generating means to provide a waveform having a basic width with each operation thereof by said starting means, said generating means being operative whenever a voltage is applied to the plate of said phantastron for measurement purposes to provide a waveform of additional width which is linearly proportional to said applied voltage, impulse generating means operatively controlled in accordance with the linear indications of the waveform generated, and time delay means for providing a time delay which is equivalent in length to the time duration of said basic waveform to thereby prevent operation of said impulse generator means prior to the elapse of the basic waveform portion.

10. In an electronic measuring device as set forth in claim 9 in which said zero set means comprises a voltage divider circuit and in which the adjustment thereof to provide voltages of various values effects the adjustment of the width of the basic waveform provided by said generating means.

11. In an electronic measuring device as set forth in claim 9 in which the input path of the device comprises a rectifier bridge, a compensating circuit, and said zero set means whereby apparatus is operative with the application of both alternating current and direct current voltage signals for measurement purposes to provide linear indications of the values thereof.

12. In an electronic measuring device for effecting the measurement of a quantity represented by an input signal, the combination of starting means operative to transmit a command pulse at a predetermined time for initiation of the operation of the measuring device, an input circuit, electronic generating means comprising a variable time base circuit which produces a linear time gate proportional to the input voltage thereof and responsive to the command pulse, for providing a waveform which is linearly indicative of the quantity being measured, means for applying the input signal to the control part of the said variable time base circuit, zero set means for additionally controlling said variable time base circuit to provide a waveform having a basic width with each operation thereof caused by said command pulse, said variable time base circuit being operative whenever said input signal is applied to said control part to provide a waveform of additional width which is linearly proportional to the said applied signal, impulse generating means operatively controlled in accordance with the linear indications of the waveform generated, and time delay means for providing a time delay which is equivalent in length to the time duration of said basic wave form to thereby prevent operation of said impulse generator means prior to the elapse of the basic waveform portion.

13. An electronic device as described in claim 12 in which the zero set means comprises a voltage producing source in the input circuit of said device to provide a voltage in addition to the input signal for controlling the width of said basic waveform.

14. A measuring device for producing a series of pulses the number of which is accurately linearly proportional to the value of the quantity being measured, comprising, a signal input, means for converting the signal into a D. C. voltage, an electronic waveform generator of the gate-producing type arranged to be triggered by a keying pulse but otherwise to be inoperative, but producing a gate only with a D. C. signal input, said wave form generator having circuit constants such that the waveform produced will be substantially linearly proportional to the voltage of the D. C. signal input, a command pulse input circuit including a time delay circuit and keying pulse producing circuit, the command pulse adapted to be supplied at will to cause the device to operate, the keying pulse producing circuit feeding and serving to trigger said waveform generator, an oscillator, an oscillator control device connected to the output of the wave form generator and connected with said oscillator to control the number of pulses produced thereby by the duration of the pulse received from the waveform generator, said control device being rendered inoperative by the output of the time delay circuit, and the time delay circuit being connected to the control device so that the pulse therefrom and that from the waveform generator arrive simultaneously.

15. A device as described in claim 14 in which there is a zero set comprising a D. C. voltage producing circuit adding to the D. C. voltage fed to the waveform generator an additional voltage whose quantity is equal in point of elapsed time of the resulting output of the waveform generator to exactly compensate for the time delay.

References Cited in the file of this patent
UNITED STATES PATENTS

| | | |
|---|---|---|
| 2,207,743 | Larson et al. | July 16, 1940 |
| 2,272,070 | Reeves | Feb. 3, 1942 |
| 2,366,913 | Le Clair | Jan. 9, 1945 |
| 2,464,607 | Pierce | Mar. 15, 1949 |
| 2,464,708 | Moseley | Mar. 15, 1949 |
| 2,520,125 | Clavier | Aug. 29, 1950 |
| 2,535,061 | Grieg | Dec. 26, 1950 |